United States Patent
Kulkarni et al.

(10) Patent No.: US 7,506,010 B2
(45) Date of Patent: Mar. 17, 2009

(54) STORING AND RETRIEVING COMPUTER DATA FILES USING AN ENCRYPTED NETWORK DRIVE FILE SYSTEM

(75) Inventors: Raghavendra Kulkarni, West Hills, CA (US); Rajesh Ramani, Simi Valley, CA (US)

(73) Assignee: Pro Softnet Corporation, Woodland Hills, CA (US)

( * ) Notice: Subject to any disclaimer, the term of this patent is extended or adjusted under 35 U.S.C. 154(b) by 162 days.

(21) Appl. No.: 11/431,845

(22) Filed: May 10, 2006

(65) Prior Publication Data

US 2006/0206547 A1 Sep. 14, 2006

Related U.S. Application Data

(63) Continuation-in-part of application No. 11/053,356, filed on Feb. 8, 2005.

(51) Int. Cl.
G06F 12/00 (2006.01)
G06F 17/30 (2006.01)

(52) U.S. Cl. .................. 707/204; 707/10; 707/100; 707/203

(58) Field of Classification Search ......... 707/200–206, 707/10, 100; 715/229
See application file for complete search history.

(56) References Cited

U.S. PATENT DOCUMENTS

| | | | | |
|---|---|---|---|---|
| 5,229,768 A | * | 7/1993 | Thomas | 341/51 |
| 5,652,879 A | * | 7/1997 | Harris et al. | 707/101 |
| 5,852,819 A | * | 12/1998 | Beller | 707/1 |
| 6,209,003 B1 | * | 3/2001 | Mattis et al. | 707/206 |
| 6,513,050 B1 | | 1/2003 | Williams et al. | |
| 6,539,396 B1 | * | 3/2003 | Bowman-Amuah | 707/203 |
| 6,542,906 B2 | | 4/2003 | Korn | |
| 6,629,110 B2 | | 9/2003 | Cane et al. | |
| 6,735,623 B1 | * | 5/2004 | Prust | 709/219 |
| 6,967,675 B1 | * | 11/2005 | Ito et al. | 348/207.1 |
| 7,058,696 B1 | * | 6/2006 | Phillips et al. | 707/10 |
| 2002/0095416 A1 | * | 7/2002 | Schwols | 707/10 |
| 2003/0105852 A1 | * | 6/2003 | Das et al. | 709/223 |
| 2004/0044698 A1 | * | 3/2004 | Ebata et al. | 707/200 |
| 2004/0167918 A1 | * | 8/2004 | Yamaguchi | 707/101 |
| 2004/0260873 A1 | * | 12/2004 | Watanabe | 711/114 |

* cited by examiner

*Primary Examiner*—Shahid A Alam
*Assistant Examiner*—Anh Ly
(74) *Attorney, Agent, or Firm*—Snell & Wilmer L.L.P.

(57) ABSTRACT

A system and method for storing computer files in a destination file is described, which may be an incremental backup system. File headers related to the files may be stored in a file index separate from a data file, or subsequent versions may be stored in the same data file while maintaining earlier versions. File headers may include locations of files, checksums, metadata about individual blocks corresponding to the data files. A system may include a client application program stored on a client computer, a network, and a server software program on a destination computer. Embodiments may include compression, encryption, or both, performed by the client application program. Files may be divided into blocks, and metadata may include locations of blocks. Files may be restored from the destination computer to the source computer. Files storage locations on the destination computer may be mapped to the client computer to appear as a virtual hard drive for convenient access by a user.

16 Claims, 9 Drawing Sheets

Destination Indexes

File Index

| Username | File ID | File Path |
|---|---|---|
| john | 1000000 | C:\My Documents\abc.doc |

File Version Index

| File ID | Version Number | Version Size | Creation Date | Last Modified Date |
|---|---|---|---|---|
| 1000000 | 1 | 120000 | 2004-07-19 10:22:40 | 2004-07-18 10:24:48 |
| 1000000 | 2 | 180000 | 2004-07-20 11:34:28 | 2004-07-19 12:01:27 |

Version Blocks Index

| File ID | Version Number | Sequence Number | Block ID | Source File Position |
|---|---|---|---|---|
| 1000000 | 1 | 1 | 1 | 0 |
| 1000000 | 1 | 2 | 2 | 30000 |
| 1000000 | 1 | 3 | 3 | 60000 |
| 1000000 | 1 | 4 | 4 | 90000 |
| 1000000 | 2 | 1 | 1 | 0 |
| 1000000 | 2 | 2 | 3 | 30000 |
| 1000000 | 2 | 3 | 5 | 60000 |
| 1000000 | 2 | 4 | 6 | 90000 |
| 1000000 | 2 | 5 | 6 | 120000 |
| 1000000 | 2 | 6 | 7 | 150000 |

Blocks Index

| File ID | Block ID | Uncompressed Block Size | Compressed and Encrypted Block Size | Block Check Sum 1 | Block Checksum 2 | Data File ID | Destination File Position |
|---|---|---|---|---|---|---|---|
| 1000000 | 1 | 30000 | 20000 | 12345 | 23456 | 1 | 0 |
| 1000000 | 2 | 30000 | 15000 | 23123 | 32123 | 1 | 20000 |
| 1000000 | 3 | 30000 | 12000 | 32457 | 37289 | 1 | 35000 |
| 1000000 | 4 | 30000 | 10000 | 67837 | 73892 | 1 | 47000 |
| 1000000 | 5 | 30000 | 10000 | 89378 | 37289 | 1 | 57000 |
| 1000000 | 6 | 30000 | 20000 | 78378 | 67899 | 1 | 77000 |
| 1000000 | 7 | 30000 | 12000 | 67389 | 37829 | 2 | 0 |

Destination File abc.doc:1 | Block ID: 1 | Block ID: 2 | Block ID: 3 | Block ID: 4 | Block ID: 5 | Block ID: 6
Destination File Position: 0 — 20000 — 35000 — 47000 — 57000 — 77000

Destination File abc.doc:2 | Block ID: 7
Destination File Position: 0

FIG. 2B

STORING AND RETRIEVING COMPUTER DATA FILES USING AN ENCRYPTED NETWORK DRIVE FILE SYSTEM

This application is a continuation-in-part of U.S. patent application Ser. No. 11/053,356, filed Feb. 8, 2005, and incorporated herein by reference.

FIELD OF THE INVENTION

This invention relates to systems and methods for storing and retrieving computer data files. More specifically, the invention relates to using a single application for automatic compression, encryption, and remote storage of files, and for automatic retrieval, decryption, and expansion of files recovered from remote storage.

BACKGROUND

Systems and methods have been used for some time for storing computer data files, for example, in a digital format. Computer data files have been stored in random access memory (RAM), punch cards, on tapes, diskettes, compact disks (CD's), flash memories and many other media. Today, large quantities of information are stored in the form of computer data files. Storing information in computer data files generally results in the information being easier to retrieve and easier to search and manipulate using computers, and requires less storage space than other systems and methods for storing information.

Unfortunately, even the best systems and methods of storing computer data files are not completely reliable. Data can be lost due, for example, to failure of the computer storage medium, operator error, software problems or viruses, or loss or destruction of the storage media. As a result, in addition to storing computer data files in a primary storage location, computer data files have been stored in a secondary storage location to prevent loss of the files in the event the primary storage location is damaged or lost. This is known as a backup system. Computer data files may be stored or archived in a backup system periodically, for example. Backup systems have been used that store computer data files at a remote location accessed via a network to protect the computer data files even if the entire facility is destroyed where the primary storage is located. Since computer data files, or parts thereof, may be changed or deleted by users, information may be lost by being deleted or overwritten. To preserve such information, different versions of the same data files have been archived.

Computer data files may be very large and it may take a lot of memory to store many large computer data files, especially if multiple versions of each file are preserved. In addition, if computer data files are stored off site, it may take a lot of network bandwidth to transmit computer data files for backup archival. Various systems and methods have been used to reduce the memory and network bandwidth required to store backup computer data files. For instance, a checksum may be used to determine whether changes have been made to particular files or blocks of information, and after being saved once, a new version may not be created if the previous version has the same checksum. A checksum may be, for example, the sum of the digits in the digital data file or the result of other mathematical computations on the numerical values of characters in the digital data file.

Another method that has been used to reduce the amount of data that must be stored or transmitted, is to store data representing changes that have been made to a file rather than storing multiple complete versions of the same file. Thus, when a backup file is retrieved, the first version is retrieved, and then the changes for the different versions are made until the desired version of the file is obtained. Such a system is called an incremental or differential backup system. Examples of such systems and related technology are described in U.S. Pat. No. 6,629,110 (Cane et al.), U.S. Pat. No. 6,513,050 (Williams et al.), and U.S. Pat. No. 6,542,906 (Korn) which are all incorporated herein by reference. Further, various methods of file compression have been used to reduce the size of files that are stored or transmitted. Although such systems and methods reduce the amount of data that is transmitted and stored, it may take more computer processing time and capacity to restore files that are stored as a number of changes to a base file.

Further, it is desirable to keep confidential at least some information contained in computer data files. When data is transmitted over a widely used network, such as the Internet, the confidentiality of the computer data files may be jeopardized. To protect the confidentiality of such information, various forms of encryption have been employed. Encryption may utilize a key to encrypt and decrypt computer data files. Encryption has been used in conjunction with backup systems.

Backup systems exist for many computer data files today, requiring a large amount of storage space, network bandwidth, and computer computational time. Thus, needs or benefits exist for storage and backup systems and methods that are more efficient. Benefits of improved systems and methods may include requiring less storage space, requiring less information to be transmitted, reducing disk or computer activity, or a combination thereof.

SUMMARY OF THE INVENTION

The present invention provides, inter alia, an incremental backup system and method that can backup and restore multiple versions of computer data files from a primary data storage such as a computer hard disk ("source"), to a secondary storage device ("destination"). The source and/or destination may either be directly connected to the same computer, or be part of a network device or a network computer such as a network attached storage device connected through a computer network. The data may be stored on the secondary device either in an uncompressed unencrypted format ("native format"), compressed format, encrypted format or in both compressed and encrypted format.

A single index or multiple indexes may be used on the destination computer to keep track of a list of backed up files, their versions, the physical location of individual fixed size or variable size portions ("blocks") corresponding to the versions of the files, or a combination thereof, which may be referred to as file headers. The file indexes may facilitate restoration of individual versions of files from the destination computer, and may be configured to keep track of file header information about files, which may provide faster and more efficient incremental backups. The system or method may provide the ability for compression and encryption of backed up data, while preserving data restorability and versioning.

Objects and benefits of the present invention include that the storage and backup systems and methods are more efficient than the prior art. The present invention may require less storage space, require that less information be stored, reduce disk or computer activity, or a combination thereof. Other benefits may be apparent to a person skilled in the art.

In specific embodiments, the present invention provides methods of storing computer data files which may include obtaining the computer data files and storing the computer data files in a destination data file. In some embodiments, the method may further include storing file headers related to the computer data files in a index that is a separate file from the destination data file. The file headers may include the location or physical path of the destination data file on the source at the time of backup, the location of the destination data file on the destination after backup, checksum information, or any combination thereof. In some embodiments, the method may include storing subsequent versions of the same computer data in the destination file while maintaining earlier versions of the computer data in the destination file. In yet another embodiment, the present invention provides a system for storing computer data files which may include a client application program stored on a client computer and configured to transmit the computer data files over a network, and a destination computer configured to receive the computer data files via the network and store the computer data files in at least one destination data file and at least one separate index.

Some embodiments may further include compressing the computer data files, encrypting the computer data files, or both, which may be done by the client application program. Some embodiments may include dividing the computer data files into blocks of data, which may also be done by the client application program, and the file headers, which may be stored in the indexes, may include locations of the blocks of data. Some embodiments may include transmitting the computer data files over a network and the computer data files may be obtained from a source computer and stored on a separate destination computer. Some embodiments may further include restoring the computer data files from the destination computer to the source computer, which may be accomplished using the client application program and the destination computer.

Additional embodiments make use of a client computer's graphical user interface operating system for facilitating storage and retrieval of data files. The storage location in a destination computer is mapped to the file management tool of the client computer so that the storage location is displayed as a virtual hard drive icon, and may be accessed without having to use an additional application. In some embodiments, a user need only drag and drop data file icons from a file directory displayed on the client computer into the virtual hard drive icon to automatically effect compression, encryption, transmission, and/or storage of client computer data files in the destination computer in a single action. Likewise, a user may retrieve or restore data files from the destination computer by dragging and dropping icons from the virtual hard drive icon into a storage location displayed on the client computer. This single action causes transmission, decryption, expansion, and/or opening of the stored data file on the client computer. Still other embodiments are presented, including methods for periodically updating a set of version-controlled documents on a client computer to a storage location on a destination computer, and providing the method as a network-based service for subscribers.

BRIEF DESCRIPTION OF THE DRAWINGS

The figures in this document illustrate various exemplary embodiments of the invention. Embodiments of the invention may include part or all of the features shown in one of these drawings, or may include features from two or more figures. Embodiments of the invention may also include features described in the specification, or limitations to features described in the specification. Furthermore, embodiments of the invention may include features that would be familiar to a person of ordinary skill in the art having studied this document.

FIG. 2B illustrates an exemplary embodiment of a destination file illustrating separate data files and indexes and multiple versions stored in one data file;

DETAILED DESCRIPTION OF EXEMPLARY EMBODIMENTS

The invention includes systems and methods of storing computer data files, which may be for purposes of backup storage. Several systems and methods for storing multiple versions of files on a data storage repository are described as examples. Some methods keep separate and complete copies of each version of a file, while some methods store metadata within one or more data files to facilitate restoration of various versions. The uniqueness of various embodiments of the present invention include that indexes are used to store information, such as file headers required to quickly and efficiently store and restore multiple versions from one computer to another. Some embodiments also provide for compression, encryption, or both of backed up data files and yet maintain restorability (the ability to restore file back to the native format) and fast and efficient incremental backups and restores.

Figures 1, 2A:
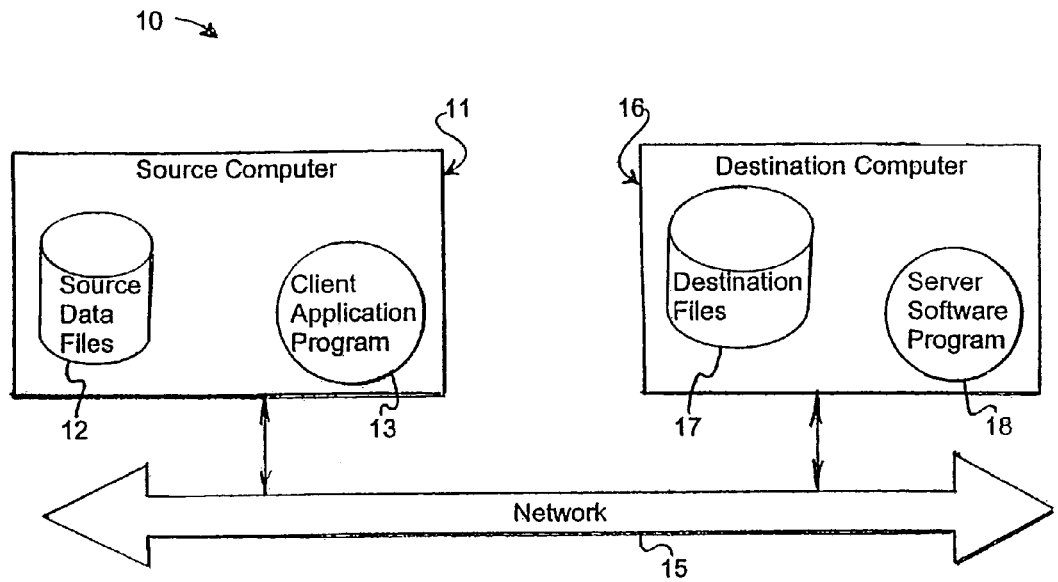
FIG. 1 is a block diagram illustrating various components of an exemplary embodiment of the invention.
FIG. 2A illustrates an exemplary embodiment of a destination file illustrating separate data files and indexes and multiple versions stored in one data file.

FIG. 1 illustrates an exemplary embodiment of a system 10 in accordance with the invention wherein source data files 12 on source computer 11 are transmitted via network 15 and stored on destination computer 16 in destination files 17. Source computer 11 may be a typical computer used by a customer, who may be an individual, a company or other organization, an employee of a company, several individuals, or the like. Client application program 13 may be loaded onto source computer 11. Server software program 18 may be loaded onto destination computer 16. Programs 13 and 18 may contain instructions to perform steps described herein.

Client software component or application program 13 on source computer 11 may work with server software program or component 18 on destination computer 16 to backup and restore source data files 12 from and to source computer 11. Client application program 13 may have access to source data files 12, and server software program 18 may have access to destination files 17. Client application program 13, server software program 18, or both, may be written in one or more of various programming languages, such as, for example, C++, visual basic, or the like.

Source data files 12 may be one or more of various kinds of computer data files, and may be stored on one or more of various kinds of computer memory or storage. The data files or source data files 12, may be stored on source computer 11 or in a primary storage device directly attached to source computer 11 such as a hard disk or a storage device made accessible to source computer 11 thorough a computer network such as a Local Area Network (LAN), the Internet or a WAN (Wide Area Network). In any case, for the purpose of this document, the source data files 12 will be referred to as being stored on source computer 11. Source data files 12 may be stored in native format on source computer 11. Source data files 12 may also be referred as 'Source File' or 'Source Files'.

Similarly, destination files 17 may be one or more of various kinds of files such as files 12, and may be stored on one or more of various types of computer memory or storage. In some embodiments, destination files 17 may be partially or fully compressed, encrypted, or both. On destination computer 16, destination files 17 may be stored in a primary storage device such as a hard disk or a storage device made accessible to destination computer 16 thorough a computer network such as a LAN, the Internet or a WAN. In any case, the destination files 17 may be referred to as being stored on the destination computer.

In some embodiments, computers 11 and 16 may be remotely located from each other. Network 15 may be a LAN, a WAN, or the Internet, for example. In some embodiments, a plurality of source computers (such as source computer 11) may be in communication via network 15, or able to communicate via network 15 to one destination computer 16. In some embodiments, there may be a plurality of destination computers 16, which may be in communication with the same or different networks 15. In such embodiments, each destination computer 16 may provide backup services for one or more source computers 11. In some embodiments, one source computer 11 may store data files 12 on more than one destination computer 16. The same source data files 12 may be stored on a plurality of destination computers 16, for redundancy, or source data files 12 may be divided between multiple destination computers 16, for example, where source data files 12 are very large.

In one embodiment, backup of computer files may be provided to customers as a service, for example, for a fee paid per month for a certain amount of storage capacity, per source computer 11, per user, per retrieval, per the amount of data that is stored, or a combination thereof, as examples. In such an embodiment, the service provider may own or operate destination computer 16, which may contain server software program 18 and storage suitable for destination files 17. The service provider may provide client application program 13 to customers for installation on their computer, for example, source computer 11. In other embodiments, the user may own destination computer 16, which may provide backup for one or more source computers 11. In such an embodiment, another entity may provide client application program 13 and server software program 18. Client application program 13, server software program 18, or both may be provided to customers via network 15, a storage device such as a CD, or the like.

In other embodiments, source computer 11 may be connected directly to destination computer 16 and network 15 may not be required for the purpose of system 10. In some embodiments, source computer 11 and destination computer 16 may be the same computer, and that computer may contain or attach to one or more memory or storage devices that may contain source data files 12 and destination files 17, which may be stored on the same or different memory or storage devices. In such embodiments, client application program 13 and server software program 18 may be loaded on the same computer, and may be parts or functional blocks of the same program. The client, server and database components may reside on the same computer as a single integrated software application.

FIGS. 2A and 2B illustrate that in exemplary embodiment 20, destination files 17 may include destination data files 21 and file index 26. Destination data files or data files 21 and file index 26 may be separate files which may be stored on the same or different storage media, which may be on or in communication with destination computer 16, for example. This exemplary embodiment uses one or more separate indexes, for example, file index 26, to maintain the file headers related to various versions of a file in order to restore files with little performance overhead, which may avoid storing complex metadata files within the target files, such as data files 21. Also unique about some embodiments is the ability to store multiple versions of a source data file 12 in a single data file 21, which may be in an encrypted or compressed format. Server software program 18 may be able to identify and locate blocks corresponding to individual file versions with the file headers contained in file index 26.

Data files 21 may contain copies of some or all of source data files 12, and may contain multiple versions of that data, for example, copied at different times. Each version may be stored as more than one block. File index 26 may include file headers related to data files 21 which may include the locations of data files 21, the locations of different versions of data files 21, the locations of different blocks of data in data files 21, the locations where data is stored on source computer 11 or in source data files 12, checksum data for files or blocks of source data files 12 or data files 21, information re when data was entered or saved, and the like. File index 26 may be used by destination computer 16 to store file headers about file versions and information to restore individual versions of backed up files from destination computer 16 to source computer 11. The file headers may include various information required to be able to restore individual versions of source data files 12 from destination files 17 or destination data files 21.

File index 26 may be unique or dedicated for each user containing file header information about the user's files only, or for multiple users containing file header information for files corresponding to multiple users. File index 26 may provide a fast and easy mechanism to identify, locate and restore portions ("blocks") of a specific version from the destination data files 21, which may in a compressed or encrypted format, or both.

File headers stored in file index 26 may be stored in the form of one or more tables, for example, and at least one table may include, for example, for each file, a username, a file ID, and a file path. For each version, the information in file index 26 may include the version number, the version size, the creation date, the date that the version was last modified, or a combination thereof, which may be stored in another index.

File index 26 may also contain information related to blocks, for example, for each version. The block information may be located in yet another table. This metadata about blocks may include the file ID, the version number, a sequence number, a block ID, the uncompressed block size, the block size when compressed, encrypted, or both, checksums for the block before and after compression, encryption, or both, the source file position, the destination file position, and the like.

Figure 3:
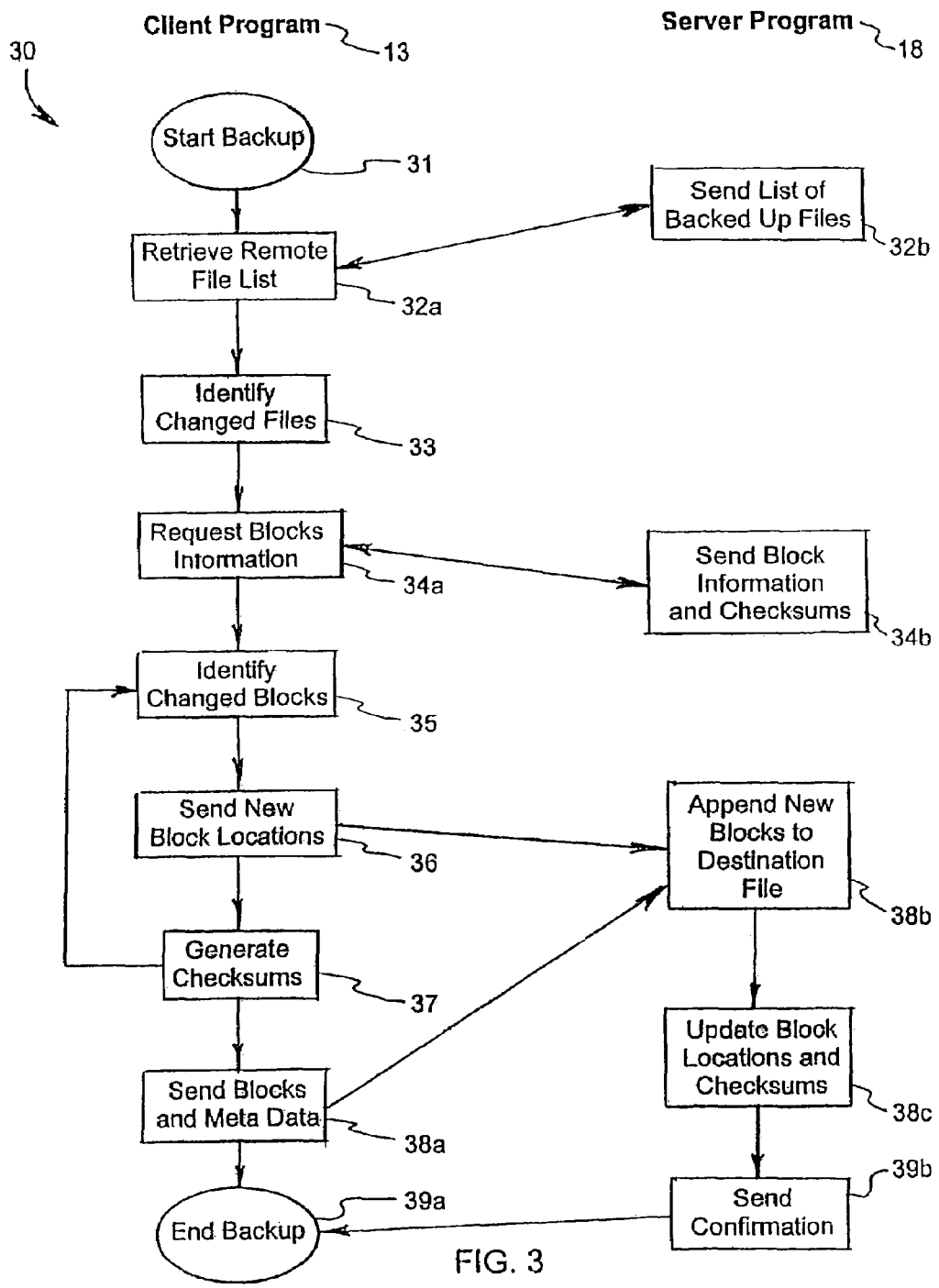
FIG. 3 is a flow chart illustrating various steps performed in an exemplary embodiment of a method of storing computer data files in accordance with the invention.

FIG. 3 illustrates various method steps that may be performed in exemplary storage method 30 in accordance with an embodiment of the present invention. The steps in the left column of FIG. 3 may be performed by source computer 11 following instructions contained in client program 13. The steps in the right column of FIG. 3 may be performed by destination computer 16 following instructions contained in server program 18.

Storage method 30 may be a method of performing incremental backups for backing up one or more data files, such as source data files 12 from a source computer 11 to a destination computer 16. Method 30 may provide for storing multiple versions of a source data file 12 within a single data file 21 in the destination computer 16. Or in some embodiments, for example, if the data file 21 exceeds the operating system allowed file size limit on destination computer 16, after backing up one or more versions, the method may provide for data file 21 to extend to multiple physical files 21.

During an initial backup, all of the source data files 12 selected for backup may be archived. During subsequent backups, in at least some embodiments, method 30 may provide for backing up only the changed or new portions of newer versions of source file 12. This may be accomplished without moving data file 21 to source computer 11 for comparing the changes between the previous version and the new version.

During the initial ("First" or "Full") backup, the user or client program 13 may start the backup (step 31), which may include identifying or reading a list of user selected files to be stored, which may be accessible from source computer 11. In some embodiments, client or source computer 11 may start the process of storing or backing up source data files 12 (step 31) by establishing a connection with destination computer 16. Client program 13 or source computer 11 may connect to server program 18 by establishing a network connection, for example, through network 15 shown in FIG. 1, and client or source computer 11 may authenticate itself by providing a username and a password.

The list of files selected by the user may be source data files 12. Each source data file 12 may be located in a directory in source computer 11 which may be referred to as the "File Source Directory". Each user's backup data files 21 or destination files 17, may be stored in a separate directory within destination computer 16, which may be referred to as the User Destination Directory. Client application program 13 may retrieve this list from server program 18 (steps 32a and 32b) and establish that source data files 12 have not already been backed up (step 33). During the first backup ("full backup" or "initial backup") for each source data file 12 in the list of files selected by the user, client application program 13 or source computer 11 may send a file information header containing the name of the file, the size of the file and the full directory path of the file on source computer 11 (step 32a).

Client application program 13 or source computer 11 may then obtain or read one or more source data files 12, which may be done sequentially in blocks of fixed size, such as 30 KB in size. A checksum may be generated for each block from the file, which may be a 32-bit, 64-bit or a 128-bit checksum ("Checksum1"), for example (step 37). The checksum may be a sequence of bits derived from the data bytes in the block. The checksum may be generated using one or more algorithms to calculate checksums, such as Cyclic Redundancy Check (CRC), which may be known and used in the industry.

In some embodiments, the block is then compressed using a compression algorithm, for example at source computer 11. Several algorithms exist, at least some of which are widely used in the industry. Examples include zip compression and RC4. Depending on the byte sequence in the block, compression typically results in a smaller block. In some embodiments, the block, which may have already been compressed, may be encrypted, for example, using an encryption algorithm based on a user provided key. Encryption may also take place at source computer 11. The encryption algorithm may work in such a way that an encrypted block of data can only be decrypted using the same key that was provided during encryption, for example, at source computer 11.

In some embodiments, a second checksum ("Checksum2") may be calculated (step 37) on the compressed and/or encrypted block, which may be done using the same or a different algorithm that was used to calculate Checksum1. At this point, the block may be sent through network 15 (step 38a), which in some embodiments may be sent along with the uncompressed (original) size of the block, the size of the block after compression and encryption ("Compressed-Encrypted size"), Checksum1, Checksum2, the position of the block in source data file 12 ("source file position"), or a combination thereof. The original size, Compressed-Encrypted size, Checksum1, Checksum2, source file position, or a combination thereof, may be or be part of the metadata for the block, which may be stored by server software program 18 in file index 26. In some embodiments, the last block in the file may be smaller than the other blocks, for example, smaller than 30 KB.

For each file received from the client, destination computer 16 or server program 18 may create a new file in the user destination directory either directly or within a sub directory structure. The physical directory where the destination file 17 is created may be referred to as "File destination directory". The file destination directory may be a sub directory of the user destination directory, and may be within file index 26. The server may also create a new file in the destination directory with the source data file 12 name as the prefix and an optional number as the suffix. This number may be the "physical file identifier". Destination computer 16 or server program 18 may also create a new list ("block list") of file headers in memory for the file being sent from the client, for example, for file index 26. Each entry in the block list may contain the original size, Compressed-Encrypted size, Checksum1, Checksum2, source file position, or a combination thereof, as well as the position where the block would be located on the destination file 17 or data file 21, which may be referred to as the destination position.

During the first backup ("full backup" or "initial backup") for each block received from the client, destination computer 16 or server program 18 may store the block by appending the block to the end of the data file 21 (step 38b). The position where a block is appended may be referred to as the "destination file position" of the block. This may be a number that denotes the number of bytes of data already in the file before the block. Destination file position of a block may be metadata or file header information for the block, which may be stored in file index 26 (step 38c). Destination computer 16 or server program 18 may calculate this number for each block sent by the client (step 38a) based on the current size of the destination data file 21 just before the new block is appended. Destination computer 16 or server program 18 may read the metadata for the block from the client (the original size, Compressed-Encrypted size, Checksum1, Checksum2, source file position), and may add an entry (step 38c) into the block list in file index 26 with a unique block id, the original size, the compressed-encrypted size, Checksum1, Checksum2, the source data file 12 position, the destination data file 21 position, or a combination thereof.

After all blocks are received from the client for the file in question (from step 38a), destination computer 16 or server program 18 may assign a new file id to the file, insert a new entry into the index named "file" (of file index 26) for the file, insert a new entry into the file version index, insert the block list from memory into the blocks and version blocks indexes, or a combination thereof (step 38c). Destination computer 16 or server program 18 may also send a confirmation to the client that the backup is complete (step 39b).

After an initial backup, one or more subsequent backups employing exemplary method 30 may be initiated by the user or by client application program 13, for example. Subsequent backups may be performed periodically, such as every few minutes, hourly, daily, weekly, monthly, at certain times per day, when source computer 11 is shut down, when a particular amount of data is changed or accumulated, after a certain number of transactions are performed, a combination thereof, or the like.

During a subsequent backup, once the backup operation is initiated (step 31), client application program 13 may retrieve a remote file list (step 32a), for example, from destination computer 16 or server software program 18. Server program 18 may send a list of files that have already been backed up, for example, from file index 26. Application program 13 may use this information to determine whether the backup is an initial backup or a subsequent backup for particular source data files 12.

A subsequent backup may be an incremental backup. The client, for example, source computer 11 or application program 13, may identify modified files for each source data file 12 in the list of files selected by the user (step 33). Client application program 13 may identify modified files using one of several standard methods, which may involve information sent by server program 18 (step 32b), which may be from file index 26. One such method of identifying modified files uses the "Archive" bit on a file. If the Archive bit is set on the file, it indicates that the file has changed since the previous backup and the file needs to be incrementally backed up.

For each modified file, the client may request the block list for the file's most recent version to be sent by the server (step 34a). The server may build a block list in memory from the blocks, version blocks, file and file version table, for example, stored in file index 26, and may send the list to the client (step 34b). The block list may contain the block id, the original size, the compressed-encrypted size, Checksum1, Checksum2, the source file position, the destination file position for each block for the previous version of the file, or a combination thereof.

In some embodiments, client program 13 may then identify changed blocks (step 35). For instance, destination computer 16 or server program 18 may check if an entry is found in the block list with a matching Checksum1. If a match is found, the client may flag the block as a matching block and may send the block id of the matching block and the position of the matching block in the new version of source data file 12 (the block may have been relocated in the modified file) to the server, for example, destination computer 16 or server software program 18 (step 36). Server program 18 may make a list of these block locations, for example, in file index 26, or add this information to file index 26 (step 38c). If a match is not found, client program 13 may obtain or read the block and calculate Checksum1 for the block (step 37) starting the next character from the current position, increment the current bytes position by one, and check for a match again (step 35). This process may continue until the end of file is reached.

Matching blocks may be contiguous within the modified file or may be separated by chunks of non-matching blocks. During the process of finding matching blocks, if a chunk of non-matching blocks is encountered, the chunk may be split, for example, into blocks of 30 KB in size (for example, if the chunk is larger than 30 KB) or a single block less than 30 KB in size, (for example, if the chunk is smaller than 30 KB). In this example, when such a chunk is split, the last block may be less than or equal to 30 KB in size. Each block in a non-matching chunk may be flagged as non-matching, and the client program 13 may calculate Checksum1 (step 37), compress and encrypt the block, calculate Checksum2 (step 37), and send the block along with srcfilepos (source file position of the block, i.e. position of the block in the source file), Checksum1, Checksum2, original block size, compressed block size (step 38a).

Server program 18, upon receiving the matching block information, may add the block information to a block list (step 38c), and upon receiving a non-matching block, may add the block to the current destination data file 21 corresponding to the source file 12 (step 38b), and may add the block information for the non-matching block to the block list, for example, in file index 26 (step 38c). At the end of backup, the server may insert block information for any new blocks to the blocks table and insert the block list for the new version to the file version and version blocks tables in file index 26 (step 38c).

In some embodiments, file headers may be stored temporarily at another location and then file index 26 may be updated with the new information. After the new blocks are stored in data files 21 (step 38b) and the file headers are stored in file index 26 (step 38c), server program 18 may send confirmation to source computer 11 or client application program 13 that the backup is complete and successful (step 39b). This may end the backup session (step 39a) until the next backup is initiated.

Figure 4:
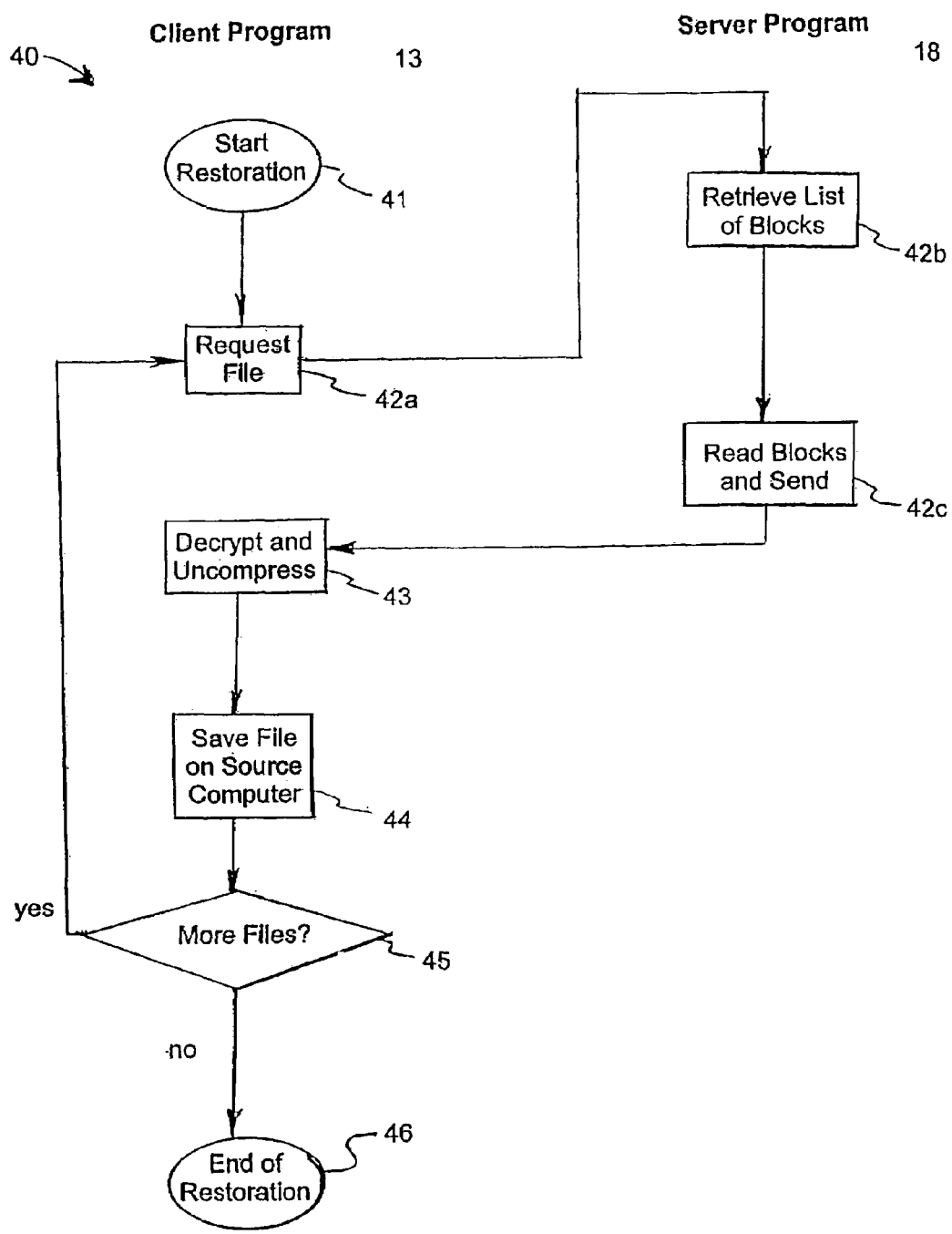
FIG. 4 is a flow chart illustrating various steps performed in an exemplary embodiment of a method of restoring computer data files in accordance with the invention.

FIG. 4 illustrates various method steps that may be performed in an exemplary retrieval or restoration method 40 in accordance with an embodiment of the present invention. The steps in the left column of FIG. 4 may be performed by source computer 11 following instructions contained in client program 13. The steps in the right column of FIG. 4 may be performed by destination computer 16 following instructions contained in server program 18.

Storing file headers in file index 26 rather than in many different data files 21 may facilitate quicker and more efficient retrieval of data files 21 because it may not, be necessary to scan through as many data files to locate metadata or particular files. Further, storing separate versions of data files 21 may facilitate quicker and more efficient retrieval of particular versions of data files 21 because it will not be necessary to make changes or as many changes to data files 21 to create the desired version.

A user, for example, of source computer 11 may initiate a restoration operation of some or all of source data files 12 (step 41). The user may identify files, versions, dates, times, etc. of the files to be restored, and request that the files be restored (step 42a). During restoration of a file version, for example, from data files 21, file index 26 may provide a straightforward mechanism to locate blocks corresponding to the file version within one or more destination files 17 and destination computer 16 may send the blocks to the client running on source computer 11.

File index 26 may facilitate restoration of a particular version of a particular file. The blocks table in conjunction with the file version and file tables, may help to quickly identify the blocks needed to retrieve the version, the location of the blocks within data file 21, the size of each block to be retrieved, the sequence in which the blocks need to be retrieved from data file 21 and the position the block should be written to in source data file 12 ('Restore File'). Destination computer 16 or server program 18 may use this information to retrieve individual blocks from data files 21 in the sequence in which the blocks are to be retrieved for the client to create one or more source data files 12.

During a restore, the server program 18 may read the blocks, file version and version information table and build a block list in memory (step 42*b*). Based on the information from each entry, server program 18 may open the destination data files 21 corresponding to the source data file 12 by going to the destination file position of the block pointed to by the block list entry. Destination computer 16 or server program 18 may then read the block and send the block to the client, for example, to source computer 11 or client application program 13 (step 42*c*). The block obtained from data file 21, for example, may be compressed, encrypted, or both, and the size of the block read may be equivalent to the compressed encrypted size of the block.

Client program 13 may create a new file or overwrite an existing file, un-compress, decrypt, or both (step 43) the blocks read, and then may save the file on the source computer (step 44), which may include appending the blocks to the newly created file. Restores may be faster with this method than the prior art.

In an illustrative example of one embodiment, there may be two versions of a user file, such as c:\my documents\abc.doc, stored on the destination computer 16. The two versions may be stored in two destination files, such as abc.doc.1 (where the .1 file suffix corresponds to data file id value of 1 in the blocks table) and abc.doc.2 (where the .2 file suffix corresponds to data file id value of 2 in the blocks table). Version 1 of the file may be 120 KB in size, for example, and may include blocks 1 thru 4 stored in destination file abc.doc.1. On the other hand, version 2 of the file may be 180 KB in size, for example, and may include blocks 1 thru 3 and 5 thru 6 in destination file abc.doc.1 and block 7 in file abc.doc.2. In order to restore version 1 of the file, the server program 18, may read the version blocks table, read the blocks ids in the table for file id 1000000 and version number 1, which may be in order of sequence, block ids, 1, 2, 3 and 4 (step 42*b*). The server 18 may then read the blocks table rows corresponding to blocks 1, 2, 3, and 4 and file id 100000. These rows may contain the positions of the blocks to be returned within the destination data files 21 as well as the data file ids and the position of the block in the restored file. For example, the first block of version 1 of the file may have a block id of 1, a data file id of 1, a destination file position as 0, and a compressed encrypted block size of 20000. To retrieve the first block, server 18 may open the file abc.doc.{data file id} which may be abc.doc.1, seek to position 0, read 20000 bytes, and return them to the client. Server program 18 may similarly fetch the 6th block in sequence of version 2, which may have a block id of 7, a data file id of 2, a compressed encrypted size of 12000, and a destination file position of 0. The server 18 may open abc.doc.{data file id} which is abc.doc.2, seek to position 0, and retrieve 12000 bytes.

In order to restore version 1 in this example, server 18 may read the version blocks table in the order of sequence number for the version (step 42*b*). This may return block ids 1, 2, 3 and 4 in the order of sequence number, for example. Server 18 may then read the blocks table and retrieve block 1, 20000 bytes in size at file position 0, block 2, 15000 bytes in size at file position 20000, block 3, 12000 bytes in size at file position 35000, and block 4, 10000 bytes in size at file position 47000, from abc.doc.1. Server 18 may then send this data to the client or to source computer 11 in the same order (step 42*c*). The client may then un-compress and decrypt (step 43) each block and append them to the source file being restored (step 44).

In order to restore version 2, server 18 may read the version blocks table (step 42*b*) in the order of the sequence number for the version. This may return block ids 1, 2, 3, 5, 6, 7 in the order of sequence number. Server 18 may then read the blocks table and retrieve block 1, 20000 bytes in size at file position 0, block 2, 15000 bytes in size at file position 20000, block 3, 12000 bytes in size at file position 35000, block 5, 10000 bytes in size at file position 57000, block 6, 20000 bytes in size at file position 77000, from abc.doc.1 and block 7, 12000 bytes in size at file position 0, from file abc.doc.2 (step 42*c*). The blocks may then be sent to the client (step 42*c*) for restoring the version on source computer 11 (step 44) after un-compression and decryption (step 43).

This process may be repeated if there are more source data files 12 to be restored (step 45). If there are no more files to be restored, then restoration is completed (step 46).

Figure 5:
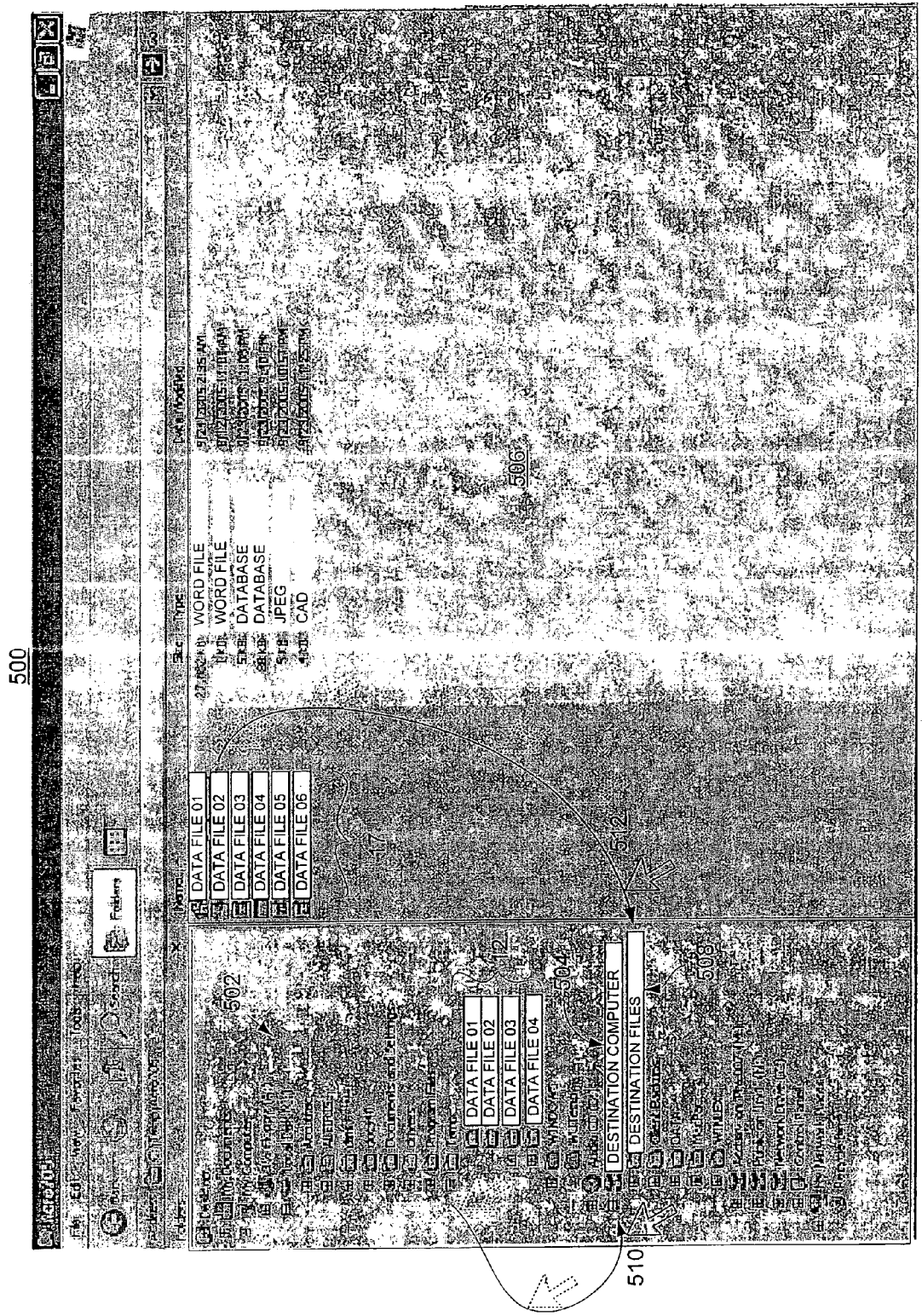
FIG. 5 is an image of a file management utility on a computer display illustrating a drag-and-drop method for effecting storage and retrieval of data files according to the invention.

FIG. 5 illustrates an embodiment of the invention from a user's perspective. This figure shows a window 500 displayed on a client or source computer terminal using a conventional file management tool such as Microsoft Windows Explorer. Operating systems other than Windows that employ similar graphical user interface tools are also within the scope of the invention.

A directory map 502 is shown in a vertical display on the left hand side of window 500. Map 502 is a logical organization of main directories and subdirectories, each of which contain various source data files 12 accessible by the client computer. The main directories represent storage locations on a variety of storage media, such as hard drives, floppy disks, CD ROM drives, and network drives. Each of the main directories is displayed as an icon in the shape of a disk or other form that represents the storage media. Each of the subdirectories is indented to the right of its parent directory, and is displayed as an icon in the shape of a file folder. The general arrangement of the map and icons is typical of various commercial file management tools presented as a graphical user interface. In an embodiment, a main directory 504 is included in map 502. Main directory 504 may represent the storage location for destination files 17 of a destination computer 16 accessible by a client or source computer 11 via network 15.

Content 506 of a directory selected from map 502 is displayed on the right hand side of window 500. Content 506 may be any combination of icons representing subdirectories and/or files contained within the selected directory. In the example shown, a subdirectory icon 508 labeled "destination files" is selected, and content 506 is a list of destination files 17 stored therein. Thus, destination computer 16 appears to a user of computer 11 as a local storage medium or "virtual zip drive", to which data files may be stored, and from which data files may be recovered. The virtual drive conveniently allows a user to automatically perform version updates, encryption, and compression of data files for storage in what appears to be a local hard drive, although in reality the storage space exists in a remote location on the network.

In a graphical user interface application such as Windows Explorer, storage of source data files 12 in destination computer 16 may be effected by dragging and dropping source data file icons displayed in map 502 into subdirectory icon 508, as indicated by arrow 510. Source data files 12 may then be stored as destination files 17 in destination computer 16 in accordance with storage method 30. In addition, restoration of source data files 12 (or equivalently, retrieval of destination files 17) may be effected by dragging and dropping one or more icons representing destination files 17 from content 506 into a directory icon shown in directory map 502, as indicated by arrow 512. Destination files 17 may then be recovered from destination computer 16 and saved as source data files 12 on source computer 11 in accordance with restoration method 40.

Figure 6:
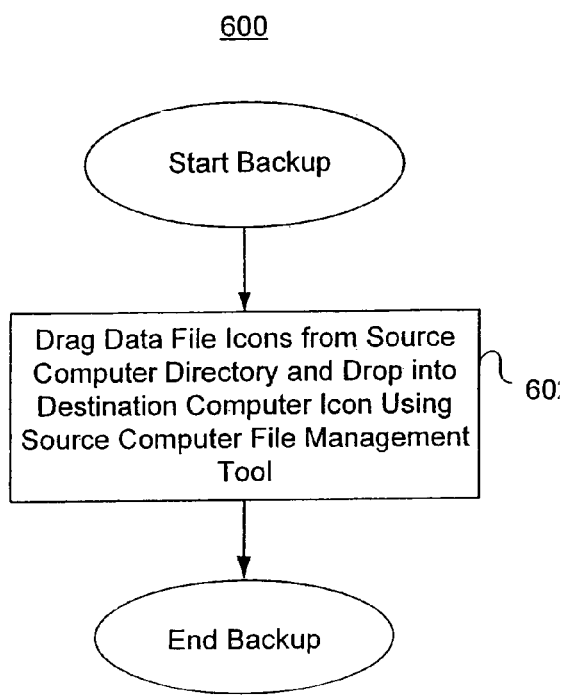
FIG. 6 is a flow chart illustrating an embodiment of a single step method performed by a user storing data files according to the invention.

In systems and methods according to the invention, the various steps involved in backing up or restoring files are invisible to the user. For example, steps 31 through 39a in method 30 may be performed automatically in response to a user moving an icon into a subdirectory displayed using a graphical user interface. FIG. 6 illustrates the simplicity of the user action. Method 600 is the user's method for backing up source data files 12. The method comprises a single process step 602, in which the user drags and drops one or more icons representing source data files into a directory or subdirectory displayed on the source computer monitor. During step 602, source computer 11 and destination computer 16 may perform all functions necessary for backing up the files, including compression, encryption, transmission, etc.

Figure 7:
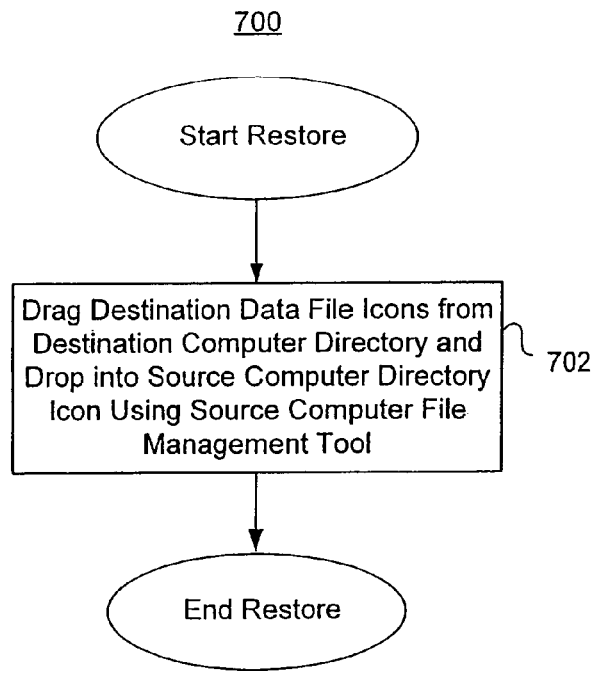
FIG. 7 is a flow chart illustrating an embodiment of a single step method performed by a user retrieving data files according to the invention.

Similarly, FIG. 7 illustrates a user's action for restoring source data files 12. The method 700 comprises a single process step 702, in which the user drags and drops one or more icons representing destination data files into a directory or subdirectory displayed on the source computer monitor. During step 702, destination computer 16 and source computer 11 may perform all functions necessary for restoring (or retrieving) the files, including transmission, decryption, expansion, etc.

Figure 8:
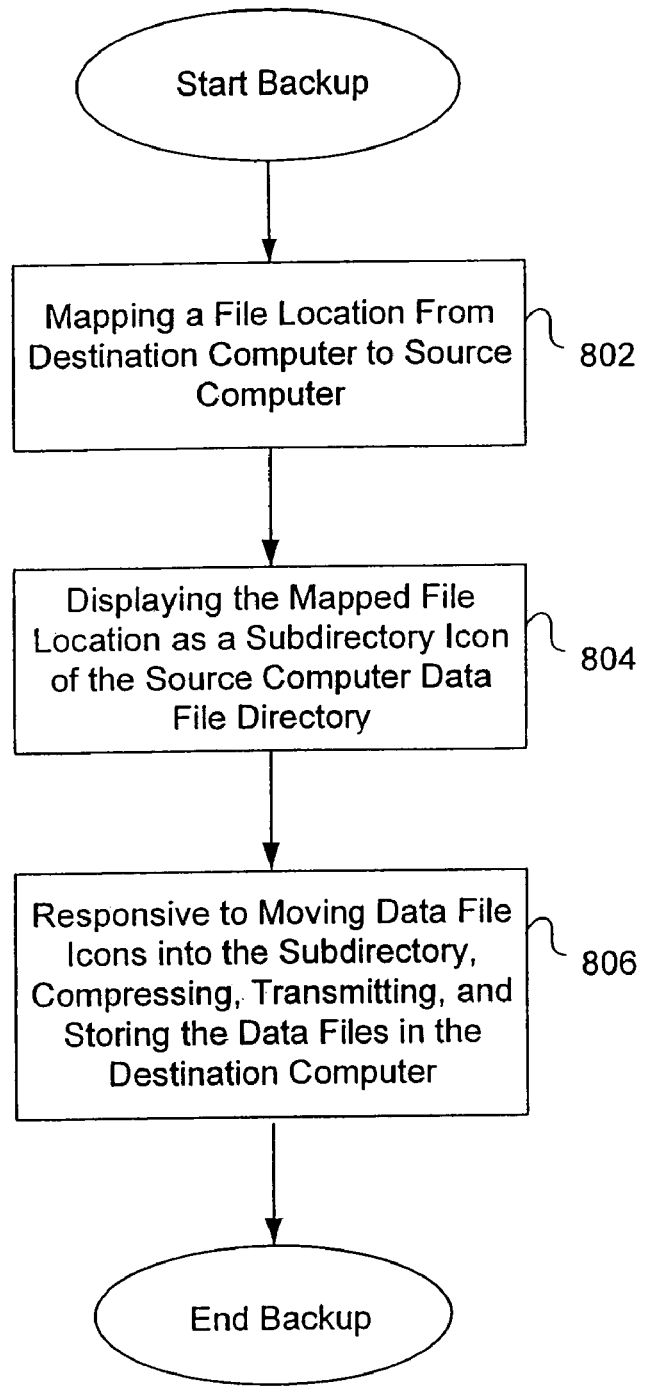
FIG. 8 is a flow chart illustrating an exemplary embodiment of a method according to the invention for backing up data files.

FIG. 8 illustrates another embodiment of a method according to the invention for storing source data files from a source computer 11 in a destination computer 16. As in previous embodiments, the destination computer is physically remote from the source computer, but accessible to the source computer via a network. Method 800 is preferably executed by a source computer system having a file management tool that displays a directory of data files stored on the source computer. The method begins at step 802. In this step, a file location from the destination computer is mapped to the source computer using the file management tool. Preferably, the file management tool is designed for easy manipulation by a user through a graphical user interface. In the next step 804, the mapped file location is displayed as a subdirectory icon of the data file directory. Thus, the file location from the destination computer appears as a virtual hard drive accessible via the source computer's directory of data files. The final step 806 is carried out in response to a user moving an icon representing a source data file into the icon representing the subdirectory. In step 806, the data files corresponding to the moved icon are first compressed, then transmitted via the network to the destination computer and stored in the physical file location represented by the subdirectory icon. Optionally, step 806 may also include encrypting the compressed data file prior to transmitting.

In accordance with an embodiment, a process such as method 800 may be used as a means of updating backup versions of version-controlled source data files. Such a process may include additional steps for verifying, prior to transmitting, whether any of the source data files to be backed up have been previously stored in the destination storage location. The verification may include, for example, comparing file header information with similar information as to the source data files identified for backup. If the comparison determines that the most recent version of a source data file has already been stored, the process ignores the backup request for that particular file. If, however, the comparison determines that another version of the source data file has been previously stored, the process is limited to compressing only a portion of the source data file that has changed since the most recent backup. For example, a change may be represented in one or more additional blocks of data associated with the source data file. In that case, only those additional blocks are compressed and transmitted for storage in the destination computer. If the comparison determines that no previous version of the source data file has been stored, all blocks of data comprising the source data file are compressed and transmitted to the destination computer.

Figure 9:
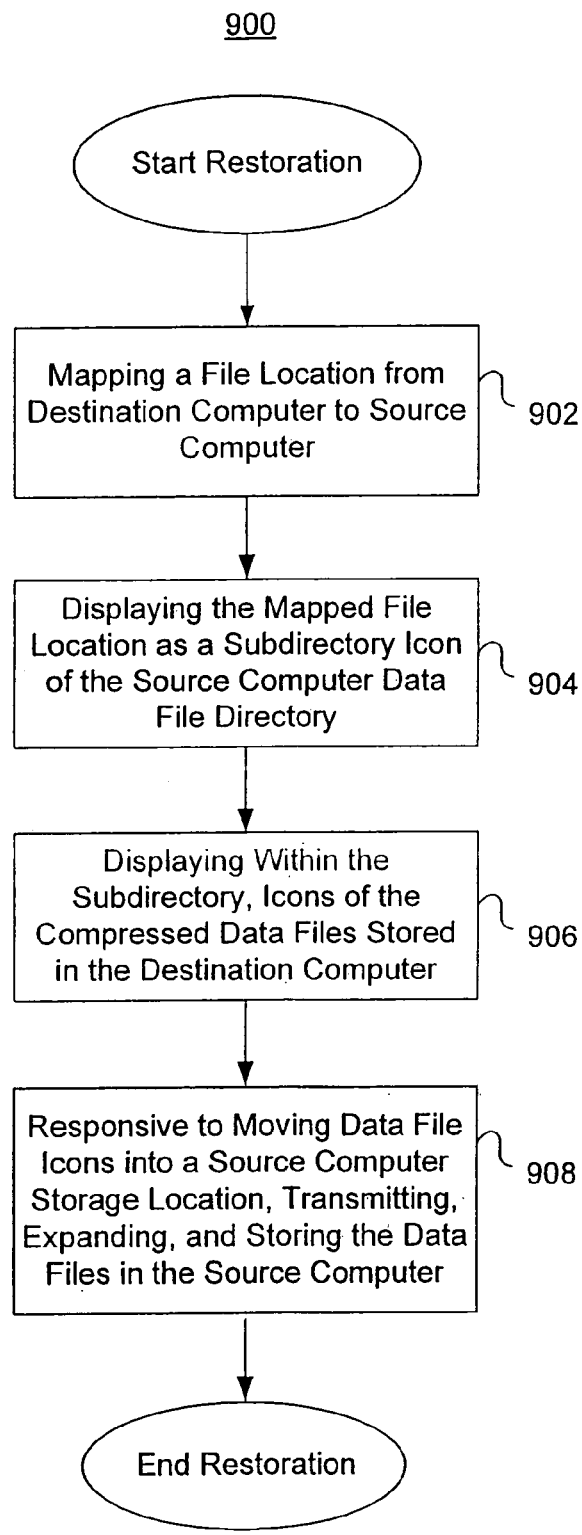
FIG. 9 is a flow chart illustrating an exemplary embodiment of a method according to the invention for retrieving data files.

FIG. 9 illustrates an embodiment of a method according to the invention for retrieving destination files from a destination computer 16 for purposes of restoring source data files in a source computer 11. Method 900 is also preferably executed by a source computer system having a file management tool that displays a directory of data files stored on the source computer. The first step in method 900 is step 902, in which a file location from the destination computer is mapped to the source computer by means of the file management tool. In the next step 904, the mapped file location is displayed as a subdirectory of the source computer's data file directory. A user may then select the subdirectory to view the contents of the subdirectory as one or more icons representing data files stored in the mapped file location. Thus, in step 906, the method displays the icons so that a user may manipulate the files using the file management tool. In the final step 908, in response to a user moving an icon into a directory representing a storage location accessible by the source computer (e.g., a hard disk, floppy drive, CD-ROM, USB drive, or similar memory device or network-attached storage device), the method may transmit a compressed data file represented by the moved icon via the network to the source computer, expand the compressed data file, and physically store the expanded data file in the storage location of the source computer. Optionally, the method may include decrypting a compressed data file prior to expansion. The decrypting may be necessary if, for example, a user elects to encrypt a source data file prior to backup. In one embodiment, a user-defined password or encryption code may be used to effect both encryption and decryption.

In accordance with another embodiment, a process such as method 900 may be employed by a source computer user when opening files stored on a destination computer. In such case, a user may manipulate an icon representing a destination file with a double-click or similar action to open the destination file in an appropriate software application running on the source computer. This action may result in automatic transmission, decryption, and/or expansion of the destination file as well as displaying content of the destination file on the source computer display terminal.

Figure 10:
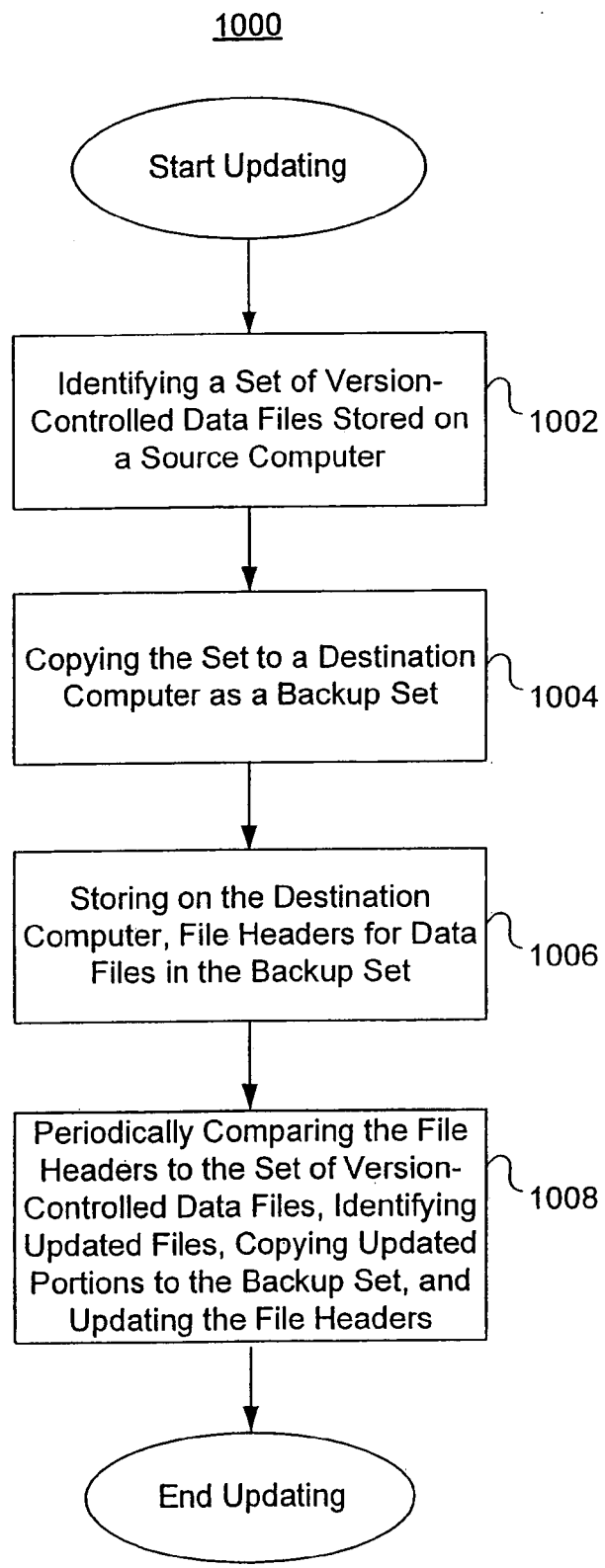
FIG. 10 is a flow chart illustrating an exemplary embodiment of a method according to the invention for periodically updating data files.

Another embodiment is illustrated in the method of FIG. 10. Method 1000 is used for periodically updating version-controlled source data files without the need for periodic user intervention. The method begins with step 1002, in which a user identifies a set of source data files that the user wishes to periodically back up. For example, the source data files in the set may contain business related information that changes on a daily basis. Customer lists, price lists, sales records, employee records, and daily correspondence are some examples. Or, the source data files may contain records of communications, manufacturing output, or other automated performance data for which historical records must be kept. Once the set of files has been identified, the method proceeds to step 1004, in which the set of files is copied to the destination computer as an initial backup set. The copying process may comprise copying compressed and/or encrypted blocks of data to the destination computer, as previously described. Then, in step 1006, the method stores, on the destination computer, file headers corresponding to data files stored as the backup set.

The final step 1008 is a backup procedure that may be carried out periodically. In an embodiment, the time period is selected by the user. In another embodiment, the backup time may recur non-periodically according to randomly selected time units. In another embodiment, a default time period such as once per day is pre-established in software such as client application program 13 or server software program 18. At each backup time, software running on the source or destination computer compares the file headers stored on the destination computer to the identified set of version-controlled data files on the source computer, and based on the comparison, those data files which have been updated since the most recent backup procedure are automatically identified. In some embodiments, only the updated portions of the identified files are copied to the backup set on the destination computer. Once all updated portions have been copied, the file headers are accordingly updated. In one embodiment, updated portions of version-controlled data files comprise one or more blocks or data. In another embodiment, each version-controlled data file or data block may be compressed and/or encrypted prior to copying:

Once method 1000 is in place, a user of the source computer may restore version-controlled data files by retrieving the backup set. Retrieval of backed up files may be accomplished by dragging and dropping icons from the virtual hard drive that represents the backup storage location in the destination computer. In this way, the transmission, decryption, and/or expansion are transparent to the user. Furthermore, users may navigate to, access, copy, or open backed up files from the destination computer using their native operating system file management tool, without the need to open a separate client application.

One application for the methods described herein for automatically backing up version-controlled data files is a network-based system. This system may be available to subscribers through a local area network (LAN) or via the Internet (world wide web). The service may allow subscribers a certain amount of storage space on a remote server accessible by the subscriber's computer. The service provider may bill each subscriber based on the amount of storage capacity used, the frequency of backup, the duration of the service, or other aspects of the service, such as licensing rights for software.

In another embodiment, the service described in the preceding paragraph is a network-based service that includes a plurality of source computers and a plurality of destination computers. The total storage capacity available on the network for backing up data files may be the sum of all storage space among all destination computers. Potentially, each source computer may have access via the network to storage space on any of the plurality of destination computers. However, in practice, each source computer may have limited access to a portion of the total storage capacity, and the portion may be determined according to the needs of each subscriber. The service provider may provice secure access to a subscriber's storage space using a central authentication system. The central authentication system may also track subscriber usage, provide automatic billing statements to each subscriber, and maintain its own data files related to these transactions.

The invention offers many conveniences and advantages. These advantages may include: compression of remotely stored files for optimizing storage capacities; encryption of remotely stored files for security; the ability to store and retirieve multiple versions of version-controlled files; and incremental backup that improves efficiency by copying only changed portions of version-controlled files selected for backup. Moreover, a user may conveniently drag and drop files and folders to perform backups or restores between a hard disk on the user's source computer and a virtual hard disk that is in reality a remote storage location.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used in this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described in this document is required for the practice of the invention unless expressly described as "essential" or "critical".

In addition, modifications may be made to the disclosed embodiments without departing from the scope of the invention. The scope of the invention is therefore not limited to the disclosed embodiments but is defined by the appended claims. In other words, other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the elements of at least one of the claims below, or the equivalents thereof, are included.

What is claimed is:

1. In a computer network having a source computer and a destination computer remote from the source computer, the source computer having a file management tool displaying a directory of data files stored on the source computer and icons representing the data files, a method for storing, in the destination computer, data files from the source computer, the method comprising:

mapping a file location from the destination computer to the source computer using the file management tool;

displaying the mapped file location as a subdirectory of the data file directory of the source computer;

in response to a user moving an icon into a displayed subdirectory, determining whether another version of the data file represented by the moved icon has been previously stored in the file location corresponding to the displayed subdirectory, compressing only a portion of the data file that has chanaed since the previous storage if another version of the data file has been previously stored, or compressing the data file represented by the moved icon if another version of the data file has not been previously stored, transmitting the compressed file to the destination computer, and storing the transmitted file in the file location corresponding to the displayed subdirectory; and in response to the user moving the icon from the displayed subdirectory to a source directory on the source computer, transmitting the compressed file represented by the moved icon to the source computer, decompressing the compressed file, storing the decompressed file in the source directory, and allowing an application on the source computer to access the decompressed file.

2. The method of claim 1 further comprising encrypting the data file prior to the transmitting.

3. The method of claim 1 wherein the compressing, encrypting, and transmitting occur automatically in response to the user moving the icon into the displayed subdirectory.

4. The method of claim 1 further comprising, prior to transmitting, verifying whether the data file represented by the moved icon has been previously stored in the file location corresponding to the displayed subdirectory.

5. In a computer network having a source computer and a destination computer remote from the source computer, the source computer having a file management tool displaying a directory of data files accessible by the source computer, a method for restoring in the source computer, data files stored in compressed form in the destination computer, the method comprising:

mapping a file location from the destination computer to the source computer using the file management tool;

displaying the mapped file location as a subdirectory of the data file directory of the source computer;

displaying within the subdirectory, icons representing the compressed data files stored in the destination computer;

in response to a user moving one or more of the icons into a directory representing a source computer storage location, transmitting the compressed data file represented by the icon via the network to the source computer, decrypting the compressed data file by means of a user-defined password provided by the user during encryption, expanding the compressed data file, and storing the expended data file in the source computer flange location;

tracking the user's usage of the file management tool; and providing an automatic billing statement to the user, the billing statement calculated based on the user's usage of the file management tool.

6. The method of claim 5 wherein the transmitting, expanding, and storing occur automatically in response to the user moving the icon into the source computer subdirectory.

7. The method of claim 5 wherein the transmitting, decrypting, expanding, and storing occur automatically in response to the user moving the icon into the source computer storage location.

8. The method of claim 5 further comprising, in response to a user opening one of the displayed icons, transmitting the compressed data file represented by the icon via the network to the source computer, expanding the compressed data file, and displaying the expanded file on the source computer.

9. In a computer network having a source computer and a destination computer remote from the source computer, a method for automatically updating backup copies on the destination computer of files created on the source computer, the method comprising:

identifying one or more version-controlled data files stored on the source computer;

copying the one or more version-controlled data files to the destination computer as a backup set;

storing on the destination computer, file headers corresponding to the one or more version-controlled data files stored as the backup set;

randomly comparing the file headers to the set-of one or more version-controlled data files, identifying which of the one or more version-controlled data files has an updated portion, copying the updated portion to the backup set, and updating the file headers; and allowing the source computer to restore the one or more version-controlled data files by retrieving the backup set, wherein the retrieving comprises decrypting the one or more version-controlled data files and expanding the one or more version-controlled data files.

10. The method of claim 9 wherein each of the one or more version-controlled data files comprise one yr more blocks of data.

11. The method of claim 9 wherein the updated portion of the one or more version-controlled data files comprise one or more blocks of data.

12. The method of claim 9 further comprising compressing each version-controlled data file prior to copying the one or more version-controlled data files.

13. The method of claim 9 further comprising encrypting each version-controlled data file prior to copying the one or more version-controlled data files.

14. The method of claim 9 wherein the computer network is a network-based file storage system having a plurality of destinations computers accessible via a network by one or more users of a plurality of source computers.

15. The method of claim 14 wherein each user subscribes for a portion of storage capacity of the plurality of destination computers.

16. The method of claim 15 further comprising billing a subscriber for automatic updating.

* * * * *